Dec. 6, 1955  W. H. VOGELSBERG  2,726,297
THERMAL WATTAGE CONTROLLER
Filed Feb. 6, 1953  2 Sheets-Sheet 1
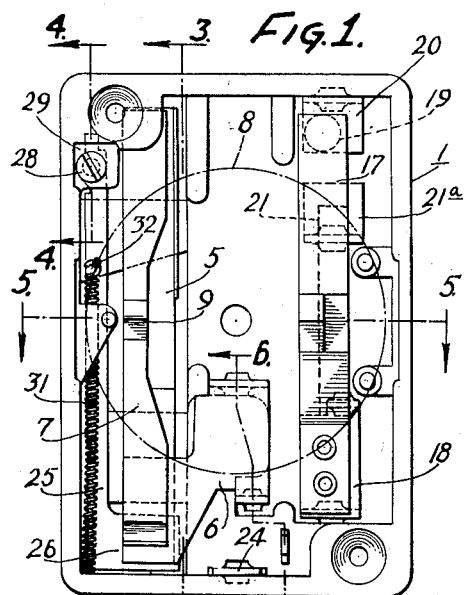
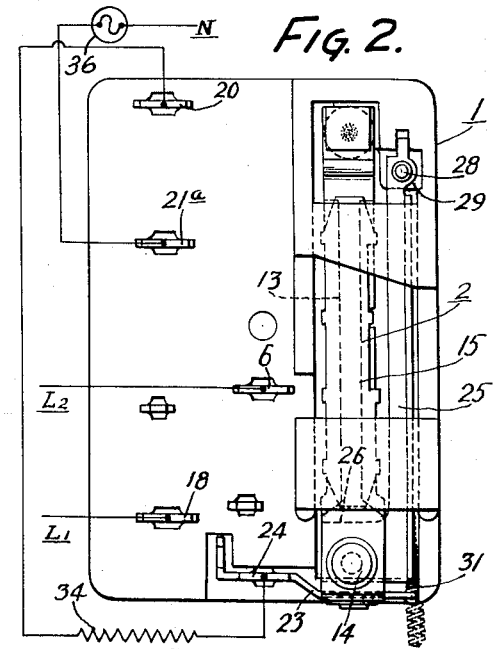
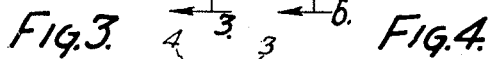
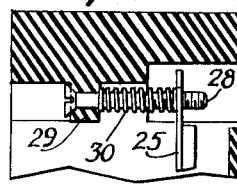
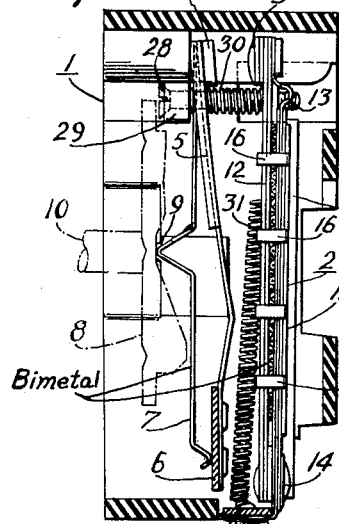
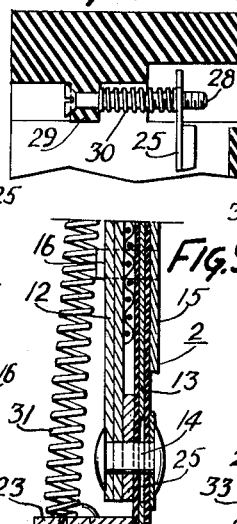
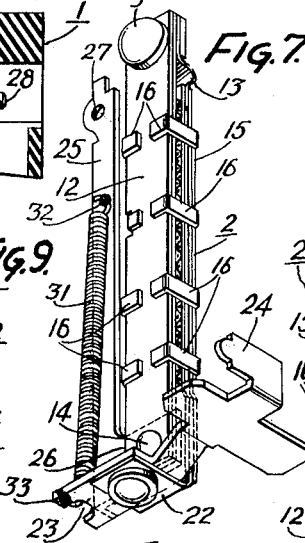
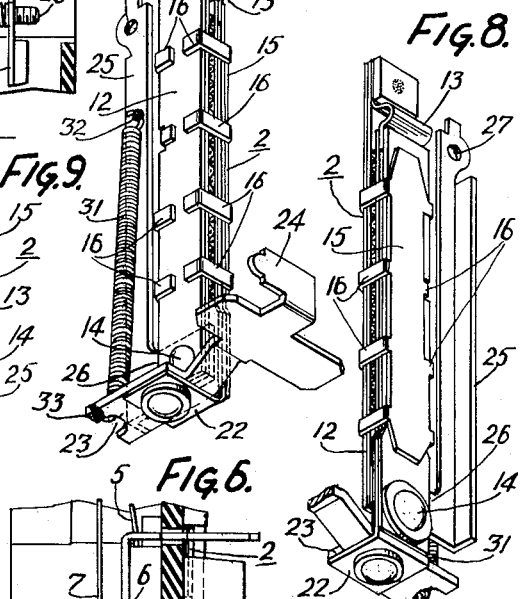
Inventor:
Walter H. Vogelsberg
by his Attorneys
Howson & Howson Dec. 6, 1955   W. H. VOGELSBERG   2,726,297
THERMAL WATTAGE CONTROLLER
Filed Feb. 6, 1953   2 Sheets-Sheet 2
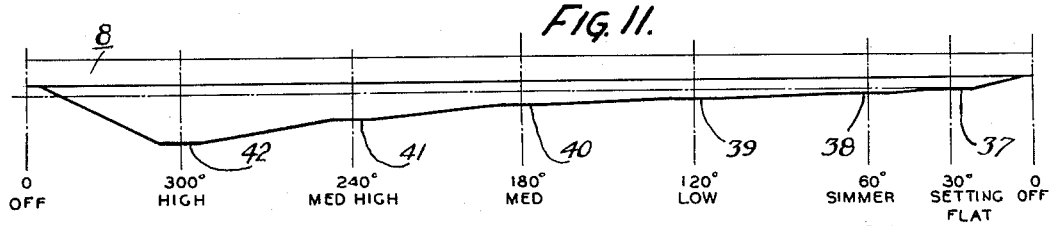
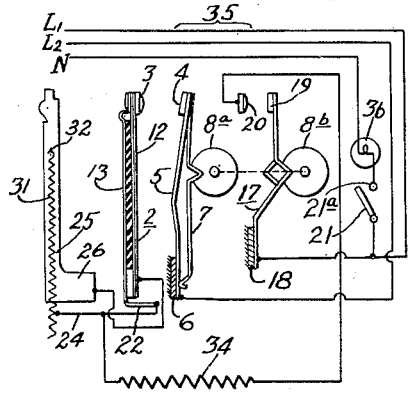
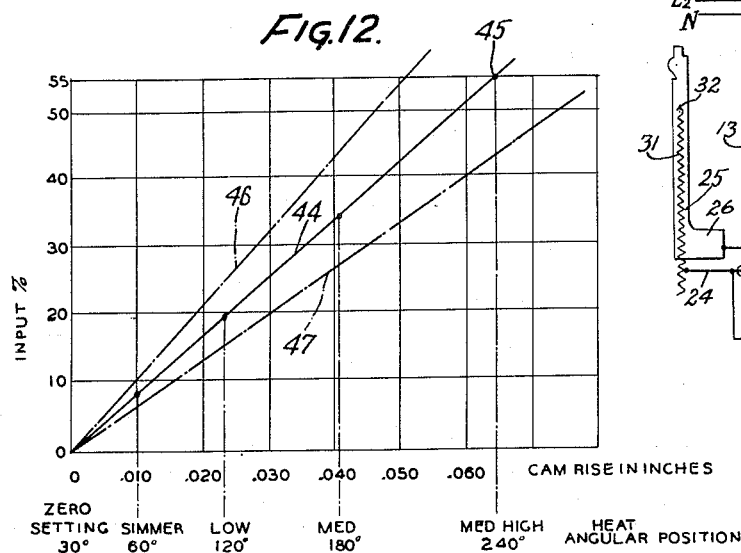
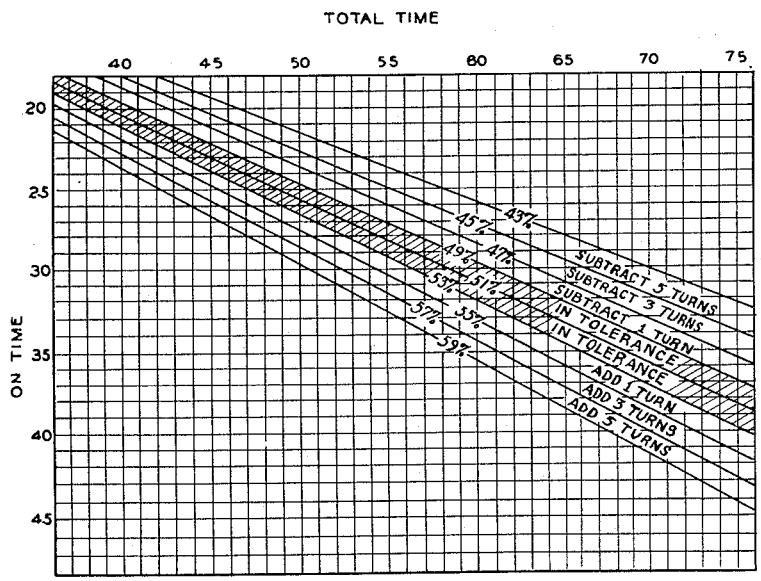
Inventor:
Walter H. Vogelsberg
by his Attorneys
Howson & Howson

United States Patent Office 2,726,297
Patented Dec. 6, 1955

2,726,297

THERMAL WATTAGE CONTROLLER

Walter H. Vogelsberg, Narberth, Pa., assignor to Proctor Electric Company, Philadelphia, Pa., a corporation of Pennsylvania Application February 6, 1953, Serial No. 335,473

12 Claims. (Cl. 200—122)

The present invention relates to thermal wattage controllers of the type used to remotely control the wattage input to a remotely connected heating load. More particularly, this invention relates to improvements in the construction and improvements for calibrating thermal wattage controllers of the type disclosed in my prior U. S. Patent No. 2,623,137, issued December 23, 1952, and in the copending application of D. E. Clapp, Serial No. 246,098, filed September 11, 1951, now U. S. Patent No. 2,673,444, issued March 30, 1954.

It is a prime object of this invention to provide a thermal wattage controller construction which will lend itself to mass production techniques.

It should be noted that there are generally two types of adjustments or calibrations necessary in devices of this type. There is, first, the "zero" or level of input adjustment. Through this adjustment it is possible to set the controller so as to provide a specific percentage input for a specific position of the control knob. The term "zero" adjustment is used widely in the industry because it usually corresponds to an adjustment of the contacts of incipient engagement. However, it is possible for some specific input, such as the simmer "heat" corresponding to approximately 8% input, to be used as a "zero" adjustment. The second type of adjustment or calibration is termed the span adjustment. Due to minor variations which may occur during mass production of a controller of this type, it is entirely possible for a controller to come off the assembly line which will give a compressed span, i. e., when going from "zero" to input to 50% on the control knob, heats equivalent to only "zero" to 40% may result at the heating unit or load. It is also possible for some of the controllers to give an expanded range. In this case, when going from "zero" to 50% input position on the control knob, a 60% input may result. Accordingly, it is sometimes necessary to adjust the span of a wattage input controller.

It is a further object of this invention to provide for simplification of both the span and the "zero" adjustments.

In mass production of controllers of this type, it is important that the calibrations be effected as quickly as possible. It is therefore important that the different calibrations will not affect each other, which would have the adverse effect of slowing down calibration of these controllers.

It is therefore a further object of this invention to provide a structure which will permit independently the "zero" and span adjustments, each adjustment having no effect upon the other. In the preferred form, the zero adjustment is made first.

By this invention, there is provided a thermostatic member to which is secured a rigid adjusting member. A flexible mount is provided for the thermostatic and rigid members, so that movement of the rigid member will result in movement of the thermostatic member. Movement of the rigid member provides the "zero" adjustment.

The span adjustment is achieved by varying the resistance of a shunt associated with a heater which thermally actuates the thermostatic member. This adjustment is made by varying the length of a resistance element which is mounted between the rigid member and the fixed support for said members.

The present invention will now be described with reference to the accompanying drawings, in which:

Fig. 1 is a front view of a thermal wattage controller in accordance with the present invention, with the front cover removed;

Fig. 2 is the rear view of the controller shown connected to a heating load;

Fig. 3 is a sectional view taken along line 3—3 of Fig. 1;

Fig. 4 is a sectional view taken along line 4—4 of Fig. 1;

Fig. 5 is a sectional view taken along line 5—5 of Fig. 1;

Fig. 6 is a sectional view taken along line 6—6 of Fig. 1;

Figs. 7 and 8 are perspective views of the thermostat assembly;

Fig. 9 is a fragmentary longitudinal sectional view of the lower part of the thermostatic member;

Fig. 10 is a diagrammatic illustration of the electrical circuit connections;

Fig. 11 is a development of the cam employed in the illustrated device; and

Figs. 12 and 13 are explanatory graphs relative to adjustment of the device.

Referring particularly to Figs. 1 to 9, the device illustrated is generally of the character disclosed in the above-mentioned patent and application. A casing 1 formed of insulating material, such as bakelite, serves to house the component parts of the device, the casing being provided with a removable front cover 1a. On one side of the casing at the rear thereof, there is a composite thermomotive member 2 which is mounted at its lower end and which carries a contact 3 at its upper end for cooperation with an adjustable contact 4. The latter contact is carried at the upper end of a resilient blade 5 which is secured at its lower end to terminal 6. A bimetallic actuating member 7 is secured at its upper end to the upper part of blade 5, while its lower end bears against the terminal 6. A circular cam 8 bears against the central portion 9 of member 7 and serves to adjust the position of the contact 4. The cam is mounted on shaft 10 and is manually rotatable by means of a rotatable knob 11. Member 7 also serves to compensate for changes in ambient air temperature, and it should be noted that this member is shielded by blade 5. The high expansion side of bimetal member 7 is toward the left in Fig. 3, and to effect compensation this member flexes so as to move contact 4 toward the right.

The composite thermomotive member 2 comprises essentially a bimetal element 12 and an associated heater element 13 secured together at their upper ends and to the contact button 3 as by welding, and also secured together at their lower ends by the rivet 14. In addition to these principal elements, the composite thermomotive member 2 comprises elements which serve to provide electrical insulation and means for rigidifying the assembly while permitting the desired thermomotive action. In the structure illustrated, the assembly comprising the thermomotive member 2 is of the type disclosed and claimed in the above-mentioned Clapp application, there being a clamp member 15 having embracing fingers 16 to secure the assembled elements together and to rigidify the composite member 2 along its length. If desired, the member 2 may take the specific form shown in the above-mentioned Vogelsberg patent. The essential structure thus far described is a current-operated thermal switch device which is adapted to operate cyclically to supply an average wattage input to the load according to the setting of the adjusting cam. In operation, the contacts 3 and 4 are initially closed, and current flows through the heater element 13 and through the closed contacts. The bimetal element 12 (whose high expansion side is on the left as viewed in Fig. 3) is heated by the heater 13, and the thermomotive action of the composite member 2 causes opening of the contacts 3 and 4 after a time interval. The device then cools until the contacts 3 and 4 again close and the cycle is repeated. The operation is the same as in the devices of the above-mentioned patent and application.

In addition to the thermostatic switch, the device comprises an on-off switch which is located at the opposite side of the casing. This switch comprises a resilient contact blade 17 having its lower end secured to a terminal 18, and carrying a contact 19 at its upper end for engagement with a stationary contact on terminal 20. The resilient blade 17 is actuated by the cam 8, and this switch serves to effect positive connection or disconnection between the load and one side of the line $L_1$. The device also preferably comprises a switch to control a pilot light, this switch comprising a resilient blade 21 also secured to terminal 18 behind the blade 17 and movable thereby into engagement with a terminal 21a.

A feature of the present invention is the mounting of the composite thermomotive member 2. As may be seen in Figs. 3, 7 and 8, the lower end of the heater strip 13 is extended and is turned through 90° to provide the extended portion 22 which is secured to an arm 23 of a stationary terminal 24. By this arrangement, the lower part of the heater strip 13 serves as a flexible mounting for the composite thermomotive member 2, permitting flexing of the latter. It is pointed out that the heater is necked-down in its active portion; however, at its base it is wide to prevent twisting in the area of the pivotal mounting 22. In practice one suitable heater was made of approximately .005" thickness material and had a width of .096 inch at the necked-down portion and a width of 5/16 inch at its base, the material being of 80% Ni, 20% Cr composition.

In further accordance with this invention, a rigid L-shaped adjusting arm 25 is secured to the lower end of the supported assembly. The base 26 of the L-shaped arm is interposed between the lower ends of bimetallic element 12 and heater element 13 and serves to physically separate these elements. The arm 25 is secured by the rivet 14 which passes through its base 26.

The arm 25 is electrically connected to the bimetal element 12 but is insulated from the heater 13. It will be seen that the arm 25 extends upward adjacent to one side of the composite thermomotive member 2, being almost as long as said member. At its upper end, the arm 25 has a threaded opening 27 which is engaged by an adjustment screw 28, as best seen in Fig. 4. The head end of the screw 28 is rotatably supported by an apertured internal extension 29 on the casing 1. The head end of the screw is accessible by means of a screwdriver through a hole in the cover plate. A spiral coil spring 30 encircles the screw 28 between arm 25 and the casing extension 29, and this spring is under compression, thus placing the screw under tension. The purpose of this is to make the adjustment screw 28 insensitive to screwdriver pressures. Thus, the arm 25 is caused to move only in response to turning of the screw 28 and is not influenced by the screwdriver pressure exerted on the screw during adjustment. The upper end of arm 25 (Fig. 2) is disposed in a guide recess formed in the casing. The adjustment of the arm 25 through the medium of screw 28 effects the "zero" adjustment previously mentioned. This adjustment will be described later.

In further accordance with the present invention, a helical resistance element 31 is mounted between the arm 25 and the arm 23 of the supporting terminal 24. This resistance element is connected in shunt with the heating element 13, as hereinafter more fully described, and it is utilized to effect the span adjustment previously mentioned. The upper end of the resistance element 31 is welded to the arm 25 at 32. The lower end of the resistance element engages an extension 33 on the fixed support 23. After the device has been checked for proper span and correction, if necessary, has been made, the resistance element is soldered to the extension 33 for permanent securement of its lower end.

Referring now to Fig. 10, the device is shown diagrammatically in association with a heating load 34, the wattage input to which is to be controlled. With proper connection to the terminals of the device, the electrical circuit is as shown. The heating load 34 is energized from the high voltage conductors $L_1$ and $L_2$ of the three-wire supply line 35 having the usual neutral conductor N. A pilot light 36 is arranged to be connected between one of the high voltage conductors and the neutral conductor. By way of example, the voltage between the conductors $L_1$ and $L_2$ may be 236 volts, while the voltage between either of these conductors and the neutral conductor N may be 118 volts. While a single circular cam having annular races is employed in the device as illustrated in Figs. 1 to 9, the cam races are shown separately in Fig. 10 at 8a and 8b for simplicity of illustration.

With the device turned on, all of the switches are closed, the pilot light 36 indicating that the device is in operation. The main circuit extends from line conductor $L_1$ through the on-off switch 19, 20, through the heating load 34, through the heater 13, through the contacts 3 and 4 of the thermostatic switch, through blade 5, and thence to the line conductor $L_2$. In accordance with one feature of the present invention, as hereinbefore mentioned, a shunt is connected across the heater 13. The shunt branch extends upward through the resistance element 31, down through the arm 25, and up through the bimetal element 12 to contact 3. Thus the resistance element 31 is connected in shunt with the heater 13. It will be seen, therefore, that the resistance of element 31 determines the current flow through the heater element 13 and therefore determines the length of the "on" portion of the operating cycle.

Fig. 11 shows the development of the controlling race of the adjustment cam. It should be noted that the cam has a setting flat 37 which is utilized in effecting the "zero" adjustment as hereinafter described. In the particular embodiment shown, this setting flat is located 30° from the off position, the dot-dash line indicating the datum of the setting flat. The cam also has flats 38 to 42 for different heats as indicated, these flats being located in the particular embodiment at the angular positions indicated. It should be noted that the flats 38 to 42 are used where the cam and control knob have discrete positions of adjustment. With continuous adjustment, such flats would normally be omitted.

As the wattage controller comes from production, an operator first sets the "zero" adjustment and then tests the controller for proper span. If the span is incorrect, the operator makes the necessary span adjustment, which does not affect the previous "zero" setting.

Referring first to the "zero" adjustment, the operator adjusts the cam to a position where the setting flat is effective, that is to say, the setting flat is brought into engagement with the portion 9 (Fig. 3) of the arm 7. With the cam in this position, the operator then adjusts the screw 28 so that the contacts 3 and 4 just close. This adjustment is the "zero" adjustment at which the input to the load may be some low value or may be practically zero. While the "zero" adjustment is preferably made by using the setting flat shown, adjusting the screw 28 to give practically zero input, the adjustment may be made at some low input setting, such as simmer, but this tends to introduce some inaccuracy. After the "zero" adjustment has been made, manual adjustment of the cam to the different heat positions will give different inputs along the solid straight line 44 in the graph of Fig. 12, if the span adjustment is correct. For example, with the cam adjusted to the medium high heat position, the input percentage should be 55%, as indicated by the point 45. By "input percentage" is meant the time percentage of the "on" portion of each complete operating cycle, during which portion the thermostatic switch is closed and the load is energized. The operator determines the input percentage for a particular cam setting in the manner hereinafter described. If the span adjustment is not correct, the input percentages at the different settings of the cam will lie along some straight line on either side of the line 44, such as the lines 46 and 47. It will be noted that adjustment of the span to obtain proper input percentages along the line 44 will not disturb the "zero" setting, as indicated by the fact that all of the lines shown extend from the zero point.

As the wattage controller comes from production, the lower end of the spiral coil resistance element 31 is not permanently secured to the lug 33, and the resistance element is of such length that effective turns thereof may be either added or subtracted. As the device comes from production, one of the turns of the resistance elements is simply hooked on to the lug 33. A wedge is inserted in the slot adjacent lug 33 to hold the wire in place. In testing for proper span, after having made the "zero" adjustment, the operator utilizes the chart shown in Fig. 13. The operator sets the cam for a particular heat, such as the medium high heat, and after several cycles of energization the operator notes the total time of the operating cycle and the "on" time during the cycle. A suitable signal circuit can be used during calibration to permit the "on" time to be measured on one clock and the total time to be measured on another clock. In the graph of Fig. 13, total cycle times in seconds are indicated along the top of the graph, while "on" times in seconds are indicated along the left-hand side of the graph. The oblique lines of the graph represent input percentages as indicated, and these lines define certain zones. The "in tolerance" zone extends between 49% and 53%, this zone being shaded in the graph. During testing of the device for correct span, with the resistance element 31 merely hooked and wedged on to the lug 33, the input percentage should fall within the "in tolerance" zone. It should be noted that the graph of Fig. 13 is for the making of the span test with the cam set in the medium high position.

In making the test for span, having determined the total time and the "on" time as mentioned above, the operator determines the input percentage from the graph. For example, if the total cycle time were 65 seconds and if the "on" time were 35 seconds, the input percentage would lie just below the "in tolerance" zone, as indicated by the point of intersection of the vertical and horizontal lines designated "65" and "35" respectively. If the input percentage falls outside the "in tolerance" zone, as in the example just given, one or more turns must be added to or subtracted from the effective length of the resistance element 31, as indicated on the graph. In the specific example given, it would be necessary to add one turn. It should be noted that on each side of the "in tolerance" zone, the oblique lines represent even numbers of turns to be added or subtracted, and the spaces between the lines represent odd numbers of turns to be added or subtracted. In adding or subtracting turns, the operator simply removes the wedge holding the wire and unhooks the resistance element 31 from the lug 33 and then rehooks the resistance element on the lug so that the required number of turns will be added or subtracted. When this is done, the resistance element is soldered to the lug, and any excess wire below the lug is cut off.

It should be noted that the "in tolerance" zone in the graph of Fig. 13 is chosen so as to allow for contact resistance at the lug 33 when the resistance element is merely hooked and wedged thereon and prior to soldering of the element. The chart of Fig. 13 is for adjustment of the span with the cam set in the medium high position, and while the "in tolerance" range in the graph is from 49% to 53%, the actual tolerance range is a little higher, e. g. about 2% higher. The actual input percentage is obtained after the resistance element is soldered to the lug 33, and if the adjustment has been made to bring the input percentage within the "in tolerance" range shown in the graph, the actual input percentage will lie within the proper range.

After the span adjustment has been made, as above described, the inputs will be proper for all settings of the cam. Since the inputs lie substantially along a straight line when plotted in the graph of Fig. 12, it is only necessary to make the span adjustment with one setting of the cam.

From the foregoing description, it will be seen that the invention provides both a novel arrangement for effecting the "zero" adjustment and a novel shunt resistance arrangement which enables adjustment of the span. It should be noted further that the shunt arrangement also permits use of a single model in commercial production for the control of heating units having different wattage capacities. Thus a controller normally used to control a 1200 watt heating unit can be used to control heating units of say 1500 watts capacity simply by adapting the shunt resistance element to shunt a relatively greater amount of current, so that the magnitude of current through the heater 13 remains substantially that flowing through the heater when calibrated for the lower wattage. It will be appreciated, of course, that reducing the resistance of the shunt element, e. g. by decreasing the length actually used, will cause it to divert a greater amount of current from the thermostat heater.

While a particular embodiment of the invention has been illustrated and described for the purpose of disclosure, the invention is not limited thereto but contemplates such other embodiments and modifications as may occur to those skilled in the art.

I claim:

1. In an adjustable wattage input controller, a composite thermomotive member including a bimetallic thermal-responsive element and a current-conductive heater element secured together, said heater element being extended at one end to serve as a pivotal mounting for the composite thermomotive member, means supporting the extended end of said heater element, switch means in circuit with said heater element and operable by said composite thermomotive member, a rigid member extending from said thermomotive member near the mounting thereof, and means for manually adjusting said rigid member to adjust the initial position of said thermomotive member about its pivotal mounting.

2. In an adjustable wattage input controller, a composite thermomotive member including a bimetallic thermal-responsive element and a current-conductive heater element secured together, means providing a pivotal mounting for one end of said thermomotive member, switch means in circuit with said heater element and operable by said composite thermomotive member, an L-shaped rigid member having its base interposed between said bimetallic and heater elements at the mount end and extending from the thermomotive member, and means for manually adjusting said rigid member to adjust the initial position of said thermomotive member about its pivotal mounting.

3. In an adjustable wattage input controller, a composite thermomotive member including a bimetallic thermal-responsive element and a current-conductive heater element secured to gether, means providing a pivotal mounting for one end of said thermomotive member, switch means in circuit with said heater element and operable by said composite thermomotive member, an L-shaped rigid member having its base interposed between said bimetallic and heater elements at the mount end and extending from the thermomotive member, an adjustable screw engaging said rigid member for calibration adjustment of said thermomotive member about its pivotal mounting, and spring means placing said screw under tension to avoid influence on the adjustment of pressure exerted on the screw.

4. In an adjustable wattage input controller, a composite thermomotive member including a bimetallic thermal-responsive element and a current-conductive heater element secured together, a terminal member, means pivotally mounting said thermomotive member on said terminal member, switch means in circuit with said heater element and operable by said composite thermomotive member, a rigid member extending from said thermomotive member near the mounting thereof, and means for manually adjusting said rigid member to adjust the initial position of said thermomotive member about its pivotal mounting.

5. In an adjustable wattage input controller, a composite thermomotive member including a bimetallic thermal-responsive element and a current-conductive heater element secured together, said heater element being extended at one end to serve as a pivotal mounting for the composite thermomotive member, means supporting the extended end of said heater element, switch means in circuit with said heater element and operable by said composite thermomotive member, a rigid member extending from said thermomotive member near the mounting thereof, means for manually adjusting said rigid member to adjust said thermomotive member, and a resistance element having one end connected to said rigid member and its other end connected to said supporting means, and connected in shunt with said heater element through said rigid member.

6. In an adjustable wattage input controller, a composite thermomotive member including a bimetallic thermal-responsive element and a current-conductive heater element secured together, said heater element being extended at one end to serve as a pivotal mounting for the composite thermomotive member, means supporting the extended end of said heater element, switch means in circuit with said heater element and operable by said composite thermomotive member, a rigid member extending from said thermomotive member near the mounting thereof, said rigid member mechanically separating said bimetallic and heater elements at the mount end, the heater element being electrically insulated from said rigid member and the bimetallic element being in engagement with said rigid member, means for manually adjusting said rigid member to adjust said thermomotive member, and a resistance element having one end connected to said rigid member and its other end connected to said supporting means, and connected in shunt with said heater element through said rigid member and said bimetallic element.

7. In an adjustable wattage input controller; an elongate composite thermomotive member including a bimetallic thermal-responsive element, a current-conductive heater element, means securing said elements together, and a contact at one end of the secured elements, said heater element being extended at the other end of the secured elements to serve as a pivotal mounting for the composite thermomotive member; means supporting the extended end of said heater element; a contact adjustably supported in cooperative relation with said first contact; and manually-operable means for adjusting said last-recited contact.

8. In an adjustable wattage input controller; an elongate composite thermomotive member including a bimetallic thermal-responsive element, a current-conductive heater element, means securing said elements together, and a contact at one end of the secured elements, said heater element being extended at the other end of the secured elements to serve as a pivotal mounting for the composite thermomotive member; means supporting the extended end of said heater element; a contact adjustably supported in cooperative relation with said first contact; manually-operable means for adjusting said last-recited contact; a rigid member extending from said thermomotive member near the mounting thereof; and means for manually adjusting said rigid member to adjust said thermomotive member and thereby adjust said first contact.

9. In an adjustable wattage input controller; an elongate composite thermomotive member including a bimetallic thermal-responsive element, a current-conductive heater element, means securing said elements together, and a contact at one end of the secured elements, said heater element being extended at the other end of the secured elements to serve as a pivotal mounting for the composite thermomotive member; means supporting the extended end of said heater element; a contact adjustably supported in cooperative relation with said first contact; manually-operable means for adjusting said last-recited contact; a rigid member extending from said thermomotive member near the mounting thereof; and a resistance element having one end connected to said rigid member and its other end connected to said supporting means, and connected in shunt with said heater element through said rigid member.

10. In an adjustable wattage input controller; an elongate composite thermomotive member including a bimetallic thermal-responsive element, a current-conductive heater element, means securing said elements together, and a contact at one end of the secured elements, said heater element being extended at the other end of the secured elements to serve as a pivotal mounting for the composite thermomotive member; means supporting the extended end of said heater element; a contact adjustably supported in cooperative relation with said first contact; manually-operable means for adjusting said last-recited contact; a rigid member extending from said thermomotive member near the mounting thereof; means for manually adjusting said rigid member to adjust said thermomotive member and thereby adjust said first contact, and a resistance element having one end connected to said rigid member and its other end connected to said supporting means, and connected in shunt with said heater element through said rigid member.

11. In an adjustable wattage input controller; an elongate composite thermomotive member including a bimetallic thermal-responsive element, a current-conductive heater element, means securing said elements together, and a contact at one end of the secured elements, said heater element being extended at the other end of the secured elements to serve as a pivotal mounting for the composite thermomotive member; means supporting the extended end of said heater element; a contact adjustably supported in cooperative relation with said first contact; a manually-operable cam for adjusting said last-recited contact, said cam having a program of increasing displacements for different wattage inputs and having a flat for zero setting; and means for manually adjusting said thermomotive member, with the cam adjusted for zero setting to adjust said first contact so that the two contacts just engage at said setting.

12. In an adjustable wattage input controller; an elongate composite thermomotive member including a bimetallic thermal-responsive element, a current-conductive heater element, means securing said elements together, and a contact at one end of the secured elements, said heater element being extended at the other end of the secured elements to serve as a pivotal mounting for the composite thermomotive member; means supporting the extended end of said heater element; a contact adjustably supported in cooperative relation with said first contact; a manually-operable cam for adjusting said last-recited contact, said cam having a program of increasing displacements for different wattage inputs and also having a flat for zero setting; a rigid member extending from said thermomotive member near the mounting thereof; and an adjustable screw engaging said rigid member for adjustment of the same, whereby to enable adjustment of said first contact, with said cam adjusted for zero setting, so that the two contacts just engage at said setting.

References Cited in the file of this patent

UNITED STATES PATENTS

| | | |
|---|---|---|
| 1,569,803 | Getchell | Jan. 12, 1926 |
| 2,116,097 | Carlson | May 3, 1938 |
| 2,199,638 | Lee | May 7, 1940 |
| 2,363,169 | Fischer | Nov. 21, 1944 |
| 2,400,984 | Dyer et al. | May 28, 1946 |
| 2,512,268 | Eros et al. | June 20, 1950 |
| 2,610,273 | Judson | Sept. 9, 1952 |
| 2,623,137 | Vogelsberg | Dec. 23, 1952 |
| 2,635,156 | Welter | Apr. 14, 1953 |
| 2,649,530 | Dietz | Aug. 18, 1953 |
| 2,673,444 | Clapp | Mar. 30, 1954 |

FOREIGN PATENTS

| | | |
|---|---|---|
| 628,220 | Great Britain | Aug. 24, 1949 |